James D. Fann
INVENTOR.

BY Arnold, Roylance & Harris

ATTORNEYS

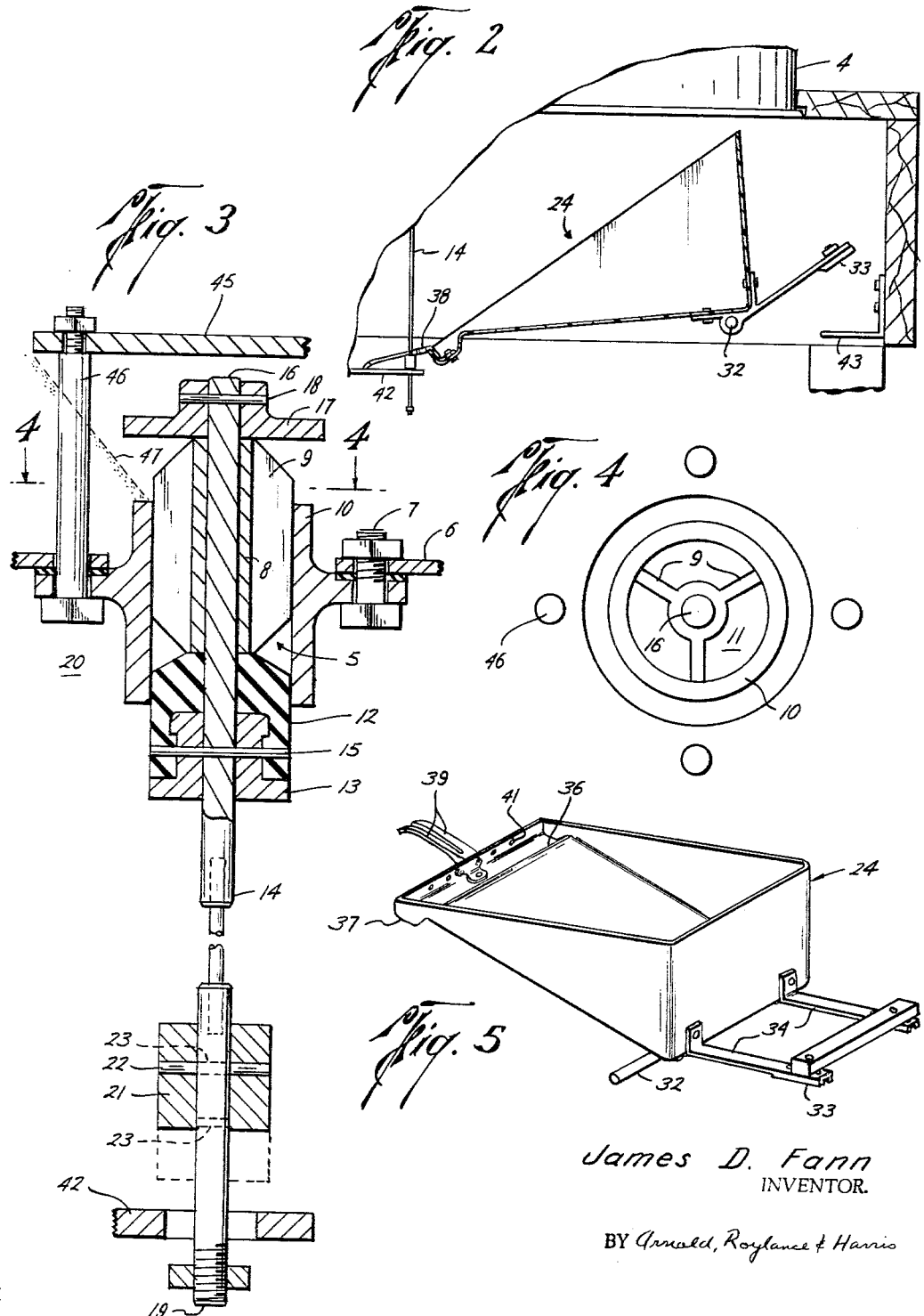

United States Patent Office 3,223,284
Patented Dec. 14, 1965

3,223,284
APPARATUS FOR DISPENSING PROPORTIONED
AMOUNTS OF SOLIDS AND LIQUIDS
James D. Fann, P.O. Box 6101, Houston 6, Tex.
Filed Dec. 24, 1963, Ser. No. 333,135
12 Claims. (Cl. 222—57)

The present invention relates to devices for dispensing solids and liquids into a vessel, and more particularly to devices which dispense the solids and liquids in proportioned amounts.

While many devices have been designed to dispense a determined quantity of solid material into a vessel for mixing with a determined amount of fluid, the design of each has been dictated to a large extent by the nature of the solid material that is to be added to the fluid. When the solid material possesses uniform physical properties under varying environmental conditions or the environmental conditions can be regulated to insure uniform physical properties, there is no significant design problem.

Where, however, the environmental conditions vary and the solid material changes its physical properties the design of a device to dispense determined quantities of the material is complicated. To illustrate, consider a solid material, composed of particulate or granular particles, which has flow characteristics similar to that of water, but which is additionally hygroscopic, i.e. absorbs water.

If the material is exposed to high humidity conditions the material may agglomerate and/or form a hard crust around feeding mechanisms possibly changing the mechanisms' ability to consistently dispense determined quantities of the solid material.

Typical of the aforementioned problem is the problem encountered in adding solid granular phosphate compounds to watering troughs frequented by stock, such as cattle and horses. Phosphate is important to the full growth of stock and the stock's supply of this chemical is conveniently supplemented by adding it to the stock's drinking water. The amount of phosphate needed varies from region to region and from season to season. If too much phosphate is added the cattle may be injured, and if too little phosphate is added full advantage of supplementing the supply is not realized. Additionally, not only must the correct amount of phosphate be added relative to the water added, but the proportioned addition of phosphate and water should be adequately mixed.

Since many of the phosphate compounds commercially available for addition to water are hygroscopic, the problem of adding determined amounts of phosphate to the stocks' water is complicated. A typical watering trough is located out on the range and should be self-tending, i.e. capable of automatically supplying water to fill up the trough and simultaneously adding a proper amount of phosphate to maintain the phosphate content of the water relatively constant.

The storage conditions for the phosphate on the range are far from controlled, except that in certain regions high humidity can be counted on, and the phosphate unless protected will cake or form a crust which can hamper the effectiveness of the feeding or dispensing mechanism causing it to falter and feed either excessive or insufficient amounts of the phosphate into the water.

Accordingly, it is an object of this invention to provide apparatuses capable of dispensing determined quantities of solid materials, such as phosphate compounds, or mixtures of phosphate compounds, vitamins, pesticides and the like, and determined amounts of fluids such as water, irrespective of the environmental conditions prevalent in areas where stock is raised.

Another object of the invention is to provide apparatuses as above which are capable of dispensing proportioned amounts of solids and fluids and which are additionally capable of dispensing the two in such a fashion that they become thoroughly mixed in the vessel into which they are discharged.

Generally, the invention may be said to comprise:

Means for storing a solid material in granular form; a chamber communicating at opposite ends with the interior and exterior of the storage means; a plunger reciprocally carried by the chamber, the plunger being smaller in cross-section than the chamber to allow granular material from the storage means to fill the space between the plunger and the chamber; seal means for preventing granular material from gravitating around the plunger when it assumes its uppermost position; a pivotally mounted bucket adapted to trip upon being filled with a fluid and after discharging its contents return to its normally upright position; means for communicating a fluid to the bucket; and means for urging the plunger down to discharge a determined amount of granular material from the storage means upon the tripping of the bucket and for returning the plunger to its uppermost position to receive another charge of the granular material when the bucket assumes its normally upright position.

To be more particular, reference is now made to the drawings:

FIG. 2 illustrates the bucket of FIG. 1 after being tripped.

FIG. 3 is a section view of a metering valve and a rod depending therefrom.

FIG. 4 is a plan view of the metering valve taken along line 4—4 of FIG. 3.

FIG. 5 is an isometric view of the bucket illustrated in FIGS. 1 and 2.

Figure 1:
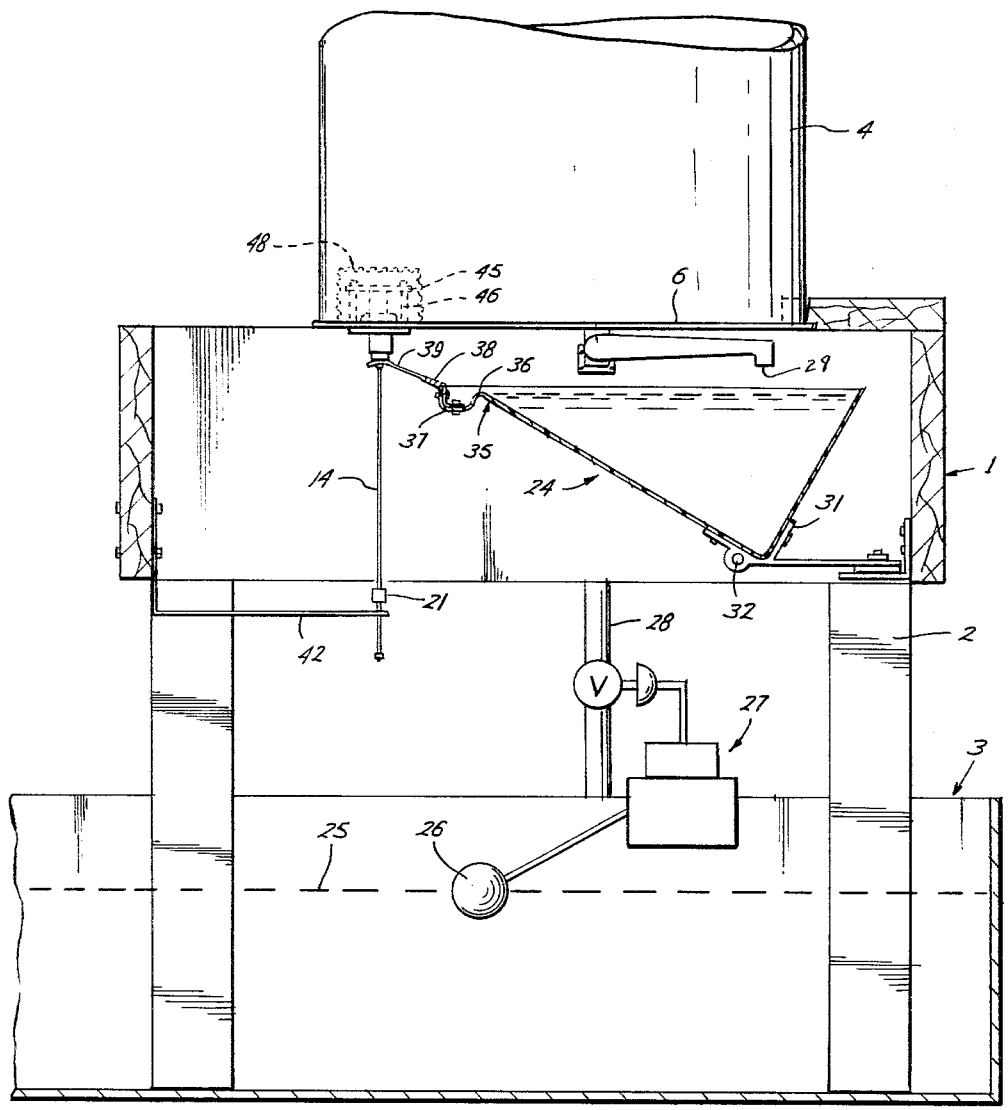
FIG. 1 represents an elevation view partially in section of one embodiment of the invention shown supported in a stock watering trough.

In the drawings reference numerals have been used to indicate parts as follows:

| | |
|---|---|
| 1—platform | 25—fluid level |
| 2—legs | 26—float |
| 3—watering trough | 27—float control valve |
| 4—container | 28—fluid line |
| 5—chamber | 29—opening |
| 6—container bottom | 30—not used |
| 7—bolt and nut | 31—bracket |
| 8—plunger | 32—shaft |
| 9—rib | 33—weight |
| 10—sleeve | 34—extensions |
| 11—compartment | 35—apex |
| 12—gasket | 36—edge |
| 13—plug | 37—trough |
| 14—rod | 38—bifurcated member |
| 15—pin | 39—bifurcate extensions |
| 16—rod end | 40—not used |
| 17—cap | 41—apertures |
| 18—pin | 42—stop bar |
| 19—rod end | 43—bucket stop bar |
| 20—metering valve | 45—plate |
| 21—collar | 46—supports |
| 22—pin | 47—angle of repose |
| 23—apertures | 48—screen |
| 24—bucket | |

As exemplified by the embodiment of the invention illustrated by FIGS. 1–4, proportioning solid and liquid dispensers may comprise a wooden frame or platform 1 supported by legs 2 in a stock watering trough 3 or the like.

Means are provided for storing a solid granular chemical material such as a phosphate compound or the like, and such means may conveniently take the form of a cylindrical container 4 supported on platform 1 and secured thereto by any suitable means.

Means are also provided for dispensing a granular material from container 4. These means may assume the form of a metering valve 20 illustrated best in FIG. 3. Referring now to FIG. 3, an annular sleeve 10 which defines chamber 5 is secured to an exit opening in bottom 6 of container 4 by bolt and nut 7. Reciprocally mounted in chamber 5 is a plunger 8 from which ribs 9 radially extend for guiding plunger 8 in its reciprocal movement. Ribs 9 form compartments 11 therebetween to receive granular material from container 4. To prevent granular material which flows into compartments 11 from flowing out of container 4 while the plunger 8 is in its upper position seal means which conveniently take the form of an annular rubber gasket 12 are provided. Gasket 12 is fitted over plug 13 and both are secured to rod 14 by pin 15. Rod 14 depends from plunger 8 and carries at the plunger oriented end 16 a cap 17 which is secured thereto by pin 18. Rod 14 proximate its lowermost end 19 carries a collar 21 which may be adjustably secured to rod 14 by passing pin 22 through a selected aperture 23.

As is evident, to dispense material from compartments 11 plunger 8 must be lowered to remove gasket 12 from chamber 5.

Means are provided for actuating plunger 8 when a determined quantity of the granular material is to be added to trough 3. These means conveniently take the form of a pivotal bucket 24, the action of which is responsive to the fluid level 25 in trough 3.

As the fluid level 25 in trough 3 drops to a determined level, float 26, through a conventional float control valve 27, permits fluid flow through line 28. Line 28 discharges the fluid through opening 29 into bucket 24, the point of discharge preferably being directly over the pivot point of bucket 24 to prevent the force of incoming fluid from causing premature or delayed tripping of the bucket 24. Bucket 24 is pivotally mounted through bracket 31 secured thereto to shaft 32. The center of gravity of bucket 24 is to the left of its point of pivot as viewed in FIGS. 1 and 2, and bucket 24 has as a result a tendency to swing downward at its plunger oriented end because the center of gravity is between that end and the pivot point. To maintain bucket 24 in normally upright position weight 33 is adjustably affixed to extensions 34 or bracket 31.

As bucket 24 fills with a fluid, the fluid will assume the form of the bucket which preferably is trangular in cross-section with an acute angle subtending apex of the triangle oriented toward plunger 8. Weight 33 is so adjusted by movement along extension 34 that it serves to maintain bucket 24 in an upright position while empty and until the fluid level in bucket 24 reaches approximately edge 36 of though 37 integral with bucket 24. As the fluid level reaches edge 36, weight 33 almost exactly counterbalances the bucket and as the fluid flows over edge 36 into trough 37 the leverage arm of the fluid weight abruptly increases causing the bucket 24 to immediately trip. Trough 37 by providing means for abruptly increasing the leverage arm assures tripping of bucket 24 and permits accurate dispensing of determined amounts of fluid. To be specific, friction between bracket 31 and shaft 32 may and probably will vary with time and with changes in temperature. For example, with time rust may form around shaft 32 causing it to resist pivotal movement of the bucket 24. If bucket 24 were not provided with trough 37 it is possible that when fluid in bucket 24 reached edge 36 the added resistance of rust on shaft 32 would create just enough imbalance to permit fluid to spill over the edge 36 at the same rate as it enters bucket 24 and bucket 24 would not trip. However, with trough 37 a small amount of fluid flowing over edge 36 abruptly lengthens the fluid's levelage arm and changes the center of gravity of bucket 24 and its contents. Thus, there is no gradual change of center of gravity as with a bucket having no trough and anticipated changes in friction between bracket 31 and shaft 32 will have little effect on the ability of bucket 24 to trip or on the amount of water needed to promote the tripping. Since approximately the same amount of fluid will consistently trip bucket 24, accuracy of proportioning between solids and fluids dispensed into vessel 3 is possible. Trough 37 has secured thereto a bifurcated member 38, the bifurcated extensions 39 of which straddle rod 14. As the bucket 24 trips, the bifurcate extensions 39 travel down rod 14 engage collar 21 causing plunger 8 to move downward and dispense granular material from compartments 11 into trough 3, the downward travel of the bifurcate member 38 and collar 21 being stopped by abutment of collar 21 with stop bar 42. As is evident then, one of the purposes of trough 37 is to provide a quick tripping action thereby to give the bifurcated member 38 sufficient momentum to apply a force to plunger 8 sufficient to dislodge any crustaceous material that may have formed around the plunger. Addtionally, the jarring effect realized when plunger 8 is actuating will vibrate the material in container 4 encouraging it to maintain a level posture and be available for filling of compartments 11.

Trough 37 is provided with apertures 41 which create some turbulence in the fluid leaving the bucket due to intermixing between fluid leaving over the top of trough 37 and fluid leaving through the apertures 41. This turbulence of dispensed fluid will aid the mixing in trough 3 of dispensed granular material and fluid. Further apertures 41 permit essentially complete drainage of all fluid from trough 37.

When the fluid has been dispensed from bucket 24, weight 33 will cause bucket 24 to again assume an upright position and in doing so bifurcate extension 39 will travel up rod 14, contact plug 13 and drive plunger 8 upward into chamber 5 to receive another load of the granular material. The clockwise pivotal movement of bucket 24 as viewed in FIGS. 1 and 2 will be terminated when weight 33 contacts bucket stop bar 43 secured to platform 1 at which time the bottom of plug 13 assumes approximately the position illustrated in FIG. 3. Since many phosphate compounds in granular form will compact and crystallize under pressure, collar 21 is preferably adjusted so that it contacts stop bar 42 before cap 17 engages shoulder of sleeve 10. Thus, the material does not compact and build up a cake around the shoulder to block flow of the granular material into compartments 11 when plunger 8 is moved upward to receive another charge of granular material. As will be observed, cap 17 to block flow of granular material into compartments 11 need only travel downward to the point where it contacts the conical surface 47 formed by the granular materials angle of repose.

To keep the mass of granular material in container 4 from inhibiting the upward travel of plunger 8, a plate 45 has been suspended directly thereabove by supports 46. The diameter of the plate is small enough to allow material along conical surface 47 to flow into compartments 11, but large enough to cover plunger 8.

A screen 48 is preferably placed over the metering valve to filter out lumps of granular material which may be present in the material as purchased or which may form due to absorption of water by the granular material while in container 4.

Should it be necessary to alter the amount of phosphate dispensed, different size plungers may be used. For example by replacing plunger 8, illustrated in FIG. 3, with a plunger having a greater outside diameter or with one having thicker ribs the space in compartments 11 will be reduced and less material will be dispensed upon each stroke of plunger 8. To replace plungers, pin 18 and cap 17 are removed from rod 14. The plunger 8 is slipped from rod 14 and another of different size is placed on rod 14 after which cap 17 and pin 18 are replaced.

Thus, by changing plungers a different proportioning of dispensed solid material and fluid is achieved. Obviously, the size of the bucket 24 could also be changed to achieve a different proportion of dispensed solid and fluid.

While one embodiment of the invention has been specifically described other embodiments will be obvious to those skilled in the art. Further, while rather specific terms have been used to discuss one embodiment of the invention they are not intended nor should they be construed to limit the scope of the invention as defined in the claims.

I claim:

1. An apparatus for discharging proportioned amounts of liquid and granular material into a vessel comprising:
   means for storing the granular material;
   a tubular member with a chamber therein which communicates at opposite ends with the interior and exterior of the storage means, the longitudinal axis of said tubular member being disposed generally perpendicular to the bottom of said storage means;
   a plunger reciprocally carried in the chamber, the plunger being smaller in cross-section than the chamber for forming a compartment into which granular material from the storage means may flow;
   seal means for preventing granular material from gravitating around the plunger when it assumes its upper position;
   a pivotally mounted bucket adapted to trip upon being filled with a fluid and after discharging its contents return to its normally upright position;
   means for communicating a fluid to the bucket;
   means for urging the plunger down to discharge granular material from the compartment upon tripping of the bucket; and,
   means for returning said bucket to its normally upright position whereupon said plunger is returned to its upper position to receive another charge of said granular material.

2. An apparatus for discharging proportioned amounts of liquid and granular material into a vessel comprising:
   means for storing the granular material;
   a sleeve with a chamber therein which communicates at opposite ends with the interior and exterior of the storage means;
   a plunger reciprocally carried in the chamber, the plunger being smaller in cross-section than the chamber for forming a compartment into which granular material from the storage means may flow, and further characterized by:
      ribs radially extending from the plunger for guiding the plunger in its reciprocating movement through the chamber; and
      a cap carried above the plunger, the cap proximately abutting the top of the annular chamber when the plunger assumes its lowermost position in dispensing granular material;
   seal means for preventing granular material from gravitating around the plunger when it assumes its upper position;
   a pivotally mounted bucket adapted to trip upon being filled with a fluid and after discharging its contents return to its normally upright position;
   means for communicating a fluid to the bucket;
   means for urging the plunger down to discharge granular material from the compartment upon tripping of the bucket; and
   means for returning said bucket to its normally upright position whereupon said plunger is returned to its upper position to receive another charge of said granular material.

3. The apparatus of claim 2 wherein the means for urging the plunger down upon tripping of the bucket comprise:
   a rod depending from the plunger with a collar affixed thereto proximate its lowermost end;
   a bifurcated member attached to the plunger oriented end of the bucket with its bifurcate extensions straddling the rod intermediate the plunger and collar ends of the rod whereby the bifurcated member will contact the collar upon tripping of the bucket to move the plunger downward and drive the plunger upward into the chamber to receive another charge of granular material when the bucket assumes its normally upright position.

4. An apparatus for discharging proportioned amounts of liquid and granular material into a vessel comprising:
   means for storing the granular material;
   a sleeve with a chamber therein which communicates at opposite ends with the interior and exterior of the storage means;
   a plunger reciprocally carried in the chamber, the plunger being smaller in cross-section than the chamber for forming a compartment into which granular material from the storage means may flow;
   seal means for preventing granular material from gravitating around the plunger when it assumes its upper position;
   a pivotally mounted bucket adapted to trip upon being filled with a fluid and after discharging its contents return to its normally upright position;
   means for communicating a fluid to the bucket;
   means for urging the plunger down to discharge granular material from the compartment upon tripping of the bucket, said means comprising:
      a rod depending from the plunger with a collar affixed thereto proximate its lowermost end;
      a bifurcated member attached to the plunger oriented end of the bucket with its bifurcate extensions straddling the rod intermediate the plunger and collar ends of the rod whereby the bifurcated member will contact the collar upon tripping of the bucket to move the plunger downward and drive the plunger upward into the chamber to receive another charge of granular material when the bucket assumes its normally upright position;
   means for returning said bucket to its normally upright position whereupon said plunger is returned to its upper position to receive another charge of said granular material.

5. An apparatus for discharging proportioned amounts of liquid and granular material into a vessel comprising:
   means for storing the granular material;
   a sleeve with a chamber therein which communicates at opposite ends with the interior and exterior of the storage means;
   a plunger reciprocally carried in the chamber, the plunger being smaller in cross-section than the chamber for forming a compartment into which granular material from the storage means may flow;
   seal means for preventing granular material from gravitating around the plunger when it assumes its upper position;
   a pivotally mounted bucket adapted to trip upon being filled with a fluid and after discharging its contents return to its normally upright position, and further characterized by
      pivotal mounting so that the center of gravity of the bucket is between the pivot point and the plunger oriented end of the bucket, and
      weight means affixed to the bucket to counteract the effect of off-center pivotal mounting and maintain the bucket in a normally upright position while empty and until almost full;

means for communicating a fluid to the bucket;
means for urging the plunger down to discharge granular material from the compartment upon tripping of the bucket; and,
means for returning said bucket to its normally upright position whereupon said plunger is returned to its upper position to receive another charge of said granular material.

6. The apparatus of claim 5 wherein:
the bucket is substantially triangular in cross-section with an acute angle subtending apex of the triangle oriented toward the plunger, and
a trough is carried by the plunger oriented end of the bucket for assuring accurate and forceful tripping of the bucket.

7. An apparatus for discharging proportioned amounts of liquid and granular material into a vessel comprising:
means for storing the granular material;
a sleeve with a chamber therein which communicates at opposite ends with the interior and exterior of the storage means;
a plunger reciprocally carried in the chamber, the plunger being smaller in cross-section than the chamber for forming a compartment into which granular material from the storage means may flow;
seal means for preventing granular material from gravitating around the plunger when it assumes its upper position;
a pivotally mounted bucket adapted to trip upon being filled with a fluid and after discharging its contents return to its normally upright position;
means for communicating a fluid to the bucket;
means for urging the plunger down to discharge granular material from the compartment upon tripping of the bucket; and,
means for returning said bucket to its normally upright position whereupon said plunger is returned to its upper position to receive another charge of said granular material wherein said apparatus additionally includes:
a plate disposed within the storage means immediately above the plunger for supporting material above the plunger and reducing the amount of force necessary to return the plunger to its upper position after completion of a downward stroke.

8. An apparatus for discharging proportional amounts of liquid and granular material into a vessel comprising:
means for storing the granular material;
a sleeve with a chamber therein which communicates at opposite ends with the interior and exterior of the storage means;
a plunger reciprocally carried in the chamber, the plunger being smaller in cross-section than the chamber for forming a compartment into which granular material from the storage means may flow;
seal means for preventing granular material from gravitating around the plunger when it assumes its upper position;
a pivotally mounted bucket adapted to trip upon being filled with a fluid and after discharging its contents return to its normally upright position;
means for communicating a fluid to the bucket;
means for urging the plunger down to discharge granular material from the compartment upon tripping of the bucket; and
means for returning said bucket to its normally upright position whereupon said plunger is returned to its upper position to receive another charge of said granular material wherein said apparatus additionally includes:
a trough carried by the plunger oriented end of the pivotal mounted bucket for assuring accurate and forceful tripping of the bucket.

9. An apparatus for discharging proportioned amounts of liquid and granular material into a vessel comprising:
a granular material storage container with an exit opening therein through which the granular material may be dispensed;
a metering valve secured in the opening, the metering valve comprising,
a sleeve defining an annular chamber which communicates at one end with the inside of the storage container and at the opposite end with the outside of the container,
a plunger reciprocally carried in the chamber, the plunger having ribs extending radially therefrom to guide the plunger in its reciprocal movement inside the chamber, the ribs additionally forming compartments therebetween into which the granular material from the vessel flows, seal means carried about the bottom of the plunger to sealingly engage the plunger in the annular chamber when the plunger is in its upper position and prevent material from gravitating from the container,
a rod secured to and depending from the plunger with a collar secured therearound proximate its lowermost end;
a pivotally mounted bucket disposed beneath the metering valve and biased to a normally upright position;
a bifurcated member attached at one end to the bucket and straddling at its opposite bifurcate end the rod depending from the metering valve; and
means responsive to the fluid level in the vessel for communicating a fluid to the bucket, the weight of the fluid in the bucket causing it to trip upon its being filled so that the bifurcate member contacts the collar on the depending rod pulling the plunger down through the annular chamber thereby discharging a determined amount of granular material into the vessel into which fluid from the tripped bucket is discharged,
the bucket upon discharging the fluid returning to its normally upright position and through the bifurcate member attached thereto forcing the plunger back up through the annular chamber to receive another charge of granular material between the ribs thereof.

10. The apparatus of claim 9 wherein the pivotal mounted bucket is further characterized by:
pivotal mounting so that the center of gravity of the bucket is between the pivot point and the metering valve oriented end of the bucket; and
weight means affixed to the bucket to counteract the effect of off-center pivotal mounting and maintain the bucket in a normally upright position while empty and until almost full.

11. The apparatus of claim 10 wherein:
the bucket is substantially triangular in cross-section with an acute angle subtending apex of the triangle oriented toward the metering valve; and
a trough is carried by the oriented end for assuring accurate and forceful tripping of the bucket.

12. The apparatus of claim 9 including:
a trough carried by the metering valve oriented end of the bucket for assuring accurate and forceful tripping of the bucket.

References Cited by the Examiner

UNITED STATES PATENTS

| | | | |
|---|---|---|---|
| 1,654,674 | 1/1928 | Beaty et al. | 222—328 X |
| 2,174,729 | 10/1939 | Schlack | 222—57 |

FOREIGN PATENTS

| | | |
|---|---|---|
| 551,084 | 12/1943 | Great Britain. |
| 254,287 | 12/1948 | Switzerland. |

RAPHAEL M. LUPO, *Primary Examiner.*

UNITED STATES PATENT OFFICE
CERTIFICATE OF CORRECTION

Patent No. 3,223,284　　　　　　　　　　　　　　　December 14, 1965

James D. Fann

It is hereby certified that error appears in the above numbered patent requiring correction and that the said Letters Patent should read as corrected below.

Column 3, line 52, for "trangular" read -- triangular --; line 58, for "though" read -- trough --; column 4, line 3, for "levelage" read -- leverage --; line 14, for "bifurcated" read -- bifurcate --.

Signed and sealed this 26th day of July 1966.

(SEAL)
Attest:

ERNEST W. SWIDER　　　　　　　　　　　　　　　EDWARD J. BRENNER
Attesting Officer　　　　　　　　　　　　　　　Commissioner of Patents